US008442687B2

(12) United States Patent
Nagasaka

(10) Patent No.: US 8,442,687 B2
(45) Date of Patent: May 14, 2013

(54) CONTROL SYSTEM, CONTROL METHOD, AND COMPUTER PROGRAM

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 986 days.

(21) Appl. No.: 11/651,505

(22) Filed: Jan. 10, 2007

(65) Prior Publication Data

US 2007/0185618 A1 Aug. 9, 2007

(30) Foreign Application Priority Data

Jan. 16, 2006 (JP) ................ P2006-007642

(51) Int. Cl.
*G05B 15/00* (2006.01)
(52) U.S. Cl.
USPC ........................................................ 700/262
(58) Field of Classification Search ............ 700/28, 700/32, 33, 38, 52, 54, 71, 245, 250, 260, 700/261, 262, 263
See application file for complete search history.

(56) References Cited

U.S. PATENT DOCUMENTS

| | | | | |
|---|---|---|---|---|
| 5,357,433 A * | 10/1994 | Takenaka et al. | ................ | 701/23 |
| 5,369,346 A * | 11/1994 | Takahashi et al. | ........ | 318/568.17 |
| 6,266,578 B1 * | 7/2001 | Udwadia | ................ | 700/260 |
| 6,901,313 B2 * | 5/2005 | Mori et al. | ................ | 700/245 |
| 7,145,305 B2 * | 12/2006 | Takenaka et al. | ........ | 318/568.12 |
| 7,216,004 B2 * | 5/2007 | Kohn et al. | ................ | 700/28 |
| 7,313,463 B2 * | 12/2007 | Herr et al. | ................ | 700/245 |
| 7,390,309 B2 * | 6/2008 | Dariush | ................ | 601/5 |
| 7,400,939 B2 * | 7/2008 | Nagasaka | ................ | 700/245 |
| 7,706,945 B2 * | 4/2010 | Deng et al. | ................ | 701/41 |
| 8,060,253 B2 * | 11/2011 | Goswami et al. | ........... | 700/250 |
| 2004/0254679 A1 * | 12/2004 | Nagasaka | ................ | 700/245 |
| 2005/0107916 A1 * | 5/2005 | Nagasaka | ................ | 700/245 |
| 2005/0113973 A1 * | 5/2005 | Endo et al. | ................ | 700/245 |
| 2005/0234593 A1 * | 10/2005 | Goswami et al. | ........... | 700/245 |
| 2006/0139355 A1 * | 6/2006 | Tak et al. | ................ | 345/473 |
| 2006/0241809 A1 * | 10/2006 | Goswami et al. | ........... | 700/245 |
| 2006/0293791 A1 * | 12/2006 | Dariush | ................ | 700/245 |
| 2007/0016329 A1 * | 1/2007 | Herr et al. | ................ | 700/250 |
| 2007/0055431 A1 * | 3/2007 | Deng et al. | ................ | 701/71 |
| 2009/0005886 A1 * | 1/2009 | Gao et al. | ................ | 700/29 |
| 2012/0035762 A1 * | 2/2012 | Goswami et al. | ........... | 700/245 |

FOREIGN PATENT DOCUMENTS

JP        A-5-305579        11/1993

(Continued)

OTHER PUBLICATIONS

Dinesh K. Pai ("Least Constraint: A Framework for the Control of Complex Mechanical Systems," in Proceedings of the American Control Conference, (Boston), pp. 1615-1621, Jun. 1991).*

Masato, Satomura et al., "Recording Material", Patent Abstracts of Japan of JP 63-151478, Jun. 24, 1998.

(Continued)

*Primary Examiner* — Thomas Black
*Assistant Examiner* — Sze-Hon Kong
(74) *Attorney, Agent, or Firm* — Finnegan Henderson Farabow Garrett & Dunner LLP

(57) ABSTRACT

A control system of a multi-link structure configured by connecting a plurality of rigid bodies together is disclosed. The control system includes: a state equation setting means; a predictive control target value setting means; a stability evaluation function setting means; an optimal control input determining means; an optimal momentum calculating means; and a joint driving method determining means.

17 Claims, 11 Drawing Sheets

FOREIGN PATENT DOCUMENTS

| | | |
|---|---|---|
| JP | 2002-086373 | 3/2002 |
| JP | 2004-142095 | 5/2004 |
| JP | 3599244 | 6/2004 |
| JP | 2004-181613 | 7/2004 |
| JP | 2004-306231 | 11/2004 |
| JP | 2005-298090 | 10/2005 |
| WO | WO 2005/098733 | 10/2005 |

OTHER PUBLICATIONS

Corresponding Japanese Patent Application: JP 2006-007642, OA issued on May 31, 2011 (2 pages).

Japanese Office Action of counterpart Japanese Application No. 2006-007642, dated Dec. 27, 2011 (3 pages).

* cited by examiner

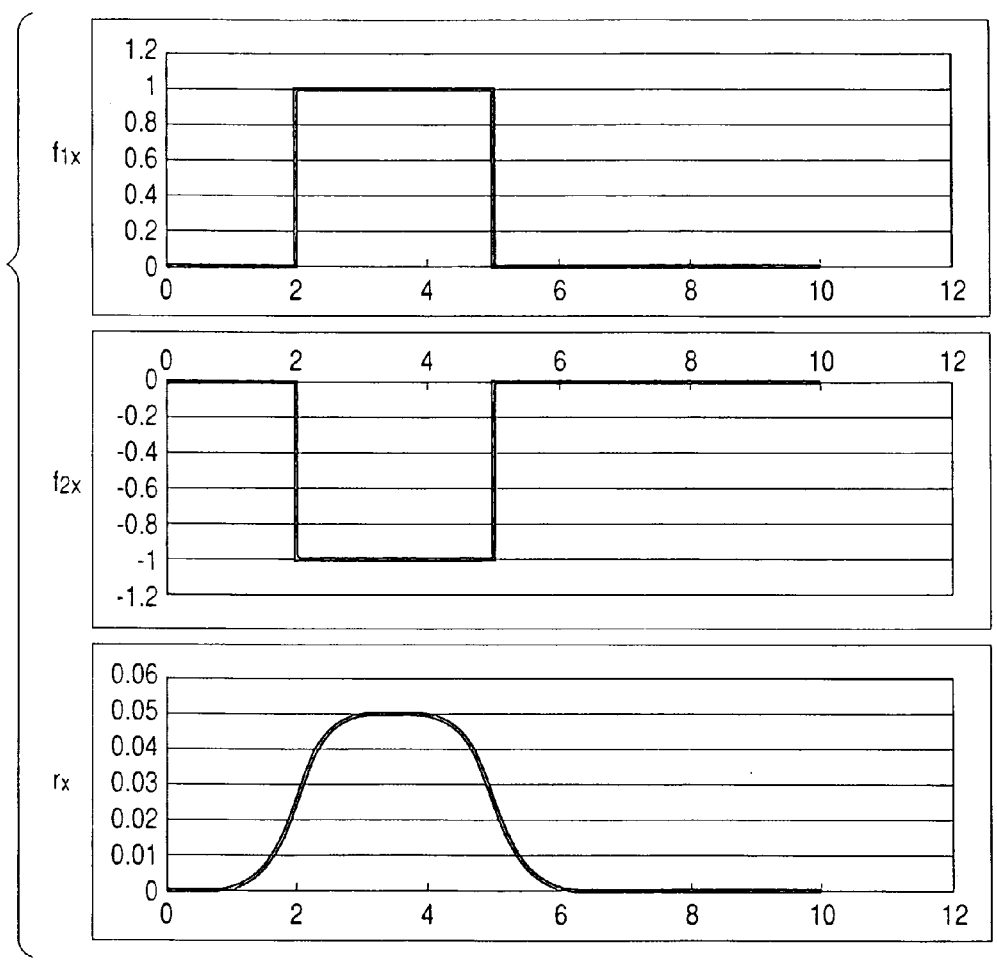

CONTROL SYSTEM, CONTROL METHOD, AND COMPUTER PROGRAM

CROSS REFERENCES TO RELATED APPLICATIONS

The present invention contains subject matter related to Japanese Patent Application JP 2006-007642 filed in the Japanese Patent Office on Jan. 16, 2006, the entire contents of which being incorporated herein by reference.

BACKGROUND OF THE INVENTION

1. Field of the Invention

The present invention relates to a control system, a control method, and a computer program which stably control multi-link structures, such as robots and characters, so that the balance of the structures may not be damaged, and particularly, to a control system, a control method, and a computer program which can be widely applied other than a planar motion without depending on a ZMP stability discrimination standard.

More specifically, the present invention relates to a control system, a control method, and a computer program which deal with a stabilizing standard in a generalized case which is not constrained by specific preconditions, and particularly, to a control system, a control method, and a computer program which realize a generalized stabilizing standard which does not depends on a contact state with an external world and a real-time numerical analysis method thereof.

2. Description of the Related Art

Attention is currently paid on applications of legged robots, such as humanoid robots and pet robots. The legged robots are more excellent than crawler-type robots in that they can realize a supple walking or traveling motion, such as going up or coming down stairs or climbing over obstacles.

Also, with improvements in the arithmetic capacity of a CPU (Central Processing Unit), or maturity of a 3D rendering technique or a dynamics simulation technique, a demand for high-reality character control which more faithfully simulates dynamic phenomena in a virtual world which deals with games or characters of human beings has been increasing.

These kinds of applications require a controller (hereinafter referred to as 'stabilizer') which stably controls multi-link structures, such as robots or characters, so that the balance of the structures may not be damaged.

For example, in the legged robots, a posture stabilization control system in which a ZMP (Zero Moment Point) becomes a standard for discriminating the stability of walking is widely known in the art. The ZMP theory is based on the 'D'Alembert's Principle' that the gravity and inertial force, and their moments which act from a walking system to a load surface are balanced with a floor reaction force and a reaction force moment which react from the road surface to the walking system. As a conclusion of the dynamic inference, a point, i.e., a ZMP where a pitch-axis moment and a roll-axis moment becomes zero exists inside a supporting polygon formed by a sole contact point on the ground and the road surface (for example, refer to 'Legged Locomotion Robots' written by Miomir Vukobratovic and 'Walking Robots and Artificial Legs' written by Ichiro Katou, et al. (published by Nikkan Kougyou Shinbun Inc.).

In target ZMP control, a movement is designed to obtain dynamic balance at every instant. Generation of a bipedal walking pattern based on the ZMP standard brings about advantages that the landing point of a sole can be set in advance, and kinematic constraint conditions of a toe according to the profile of a road surface can be easily considered.

For example, a walking control device for a bipedal-walking-type legged mobile robot which drives a leg joint so that the ZMP may be caused to coincide with a target value and which detects inclination of an upper body to drive the same leg joint so that the ZMP may be caused to coincide with a command value is proposed (for example, refer to JP-A-5-305579).

Also, a robot apparatus in which a walking control system is configured such that physical quantities in a real world, such as the motion state quantities, external forces, and external force moments of a robot, which are measured by sensors, and environmental shapes, are input, and which allows operations for generation of a walking pattern of the robot to be executed in real time on a real machine in such a manner that parameters, such as boundary conditions, external forces, external force moments, and sole tracks on the motion state quantities, can be set is also proposed (for example, refer to JP-A-2004-142095). According to this apparatus, all the operations on the maintenance of balance of a machine body are collected in a single waling pattern operation, so that a waking-generating function and an adaptive control function can be made efficiently compatible with each other, the consistency of dynamic models can be ensured, and any interference between the dynamic models can be eliminated.

Also, a motion control device of a robot which carries out an operation of a stable motion pattern in real time in consideration of both a grounding state and a non-grounding state using the ZMP as a stability discrimination standard is also proposed (for example, refer to the specification of Japanese Patent No. 3599244). According to this device, a dynamic equation with boundary conditions concerning a future center-of-gravity horizontal track of a robot is solved so as to be continuously connected to a current center-of-gravity horizontal position/speed under the condition that a moment around a horizontal axis around a point within a supporting polygon at the time of grounding is zero or a horizontal translational force at the time of non-grounding is zero, a dynamic equation with boundary conditions concerning a future center-of-gravity vertical track of the robot is solved so as to be continuously connected to a current center-of-gravity vertical position/speed under the condition that a vertical translational force acting other than gravity at the time of non-grounding becomes zero, and a motional state at the next time is determined so as to realize the determined center-of-gravity position as a moment around the center-of-gravity moment at the time of non-grounding becomes zero. That is, since the solutions of dynamic equations with boundary conditions concerning a center-of-gravity horizontal position track and a center-of-gravity vertical position track are calculated for every control period, and the motional state of the robot apparatus is determined for every control period while the moment around the center of gravity of the robot apparatus is adjusted, the motion of the robot apparatus can be controlled in real time.

Also, a technique of adopting a linear inverted pendulum mode, which is obtained by further simplifying the ZMP stability discrimination standard, as a standard, is also known (for example, refer to the specification of Japanese Patent Application No. 61-298406, and 'Real-time Control of Dynamic Bipedal Walking Robot Adopting Linear Inverted Pendulum Mode as Standard' written by Kajita (Pages 1 to 68, No. 171 of Report issued by Mechanical Engineering Laboratory in 1996)

However, the stabilizer based on the ZMP stability discrimination standard is basically limited to a planar motion (walking) in its applicable scope, and has the precondition that each leg of the robot should not simultaneously touch a group of planes having different normal lines. In other words, general cases outside the scope of the preconditions, such as a case where a robot travels while simultaneously touching a plurality of planes having different normal vectors or a case where a robot floats in a space while hanging down from a horizontal bar cannot be dealt with by the ZMP stability discrimination standard.

Although the concept called overturn stability is introduced as a stability discrimination standard intended for such general cases (for example, refer to Non-Patent Document 3), it does not reach the configuration for a real-time solution.

A solution of performing real-time control by configuring a plurality of stabilizers which are specialized for every precondition, like the case where a robot travels while simultaneously touching a plurality of planes having different normal vectors or the case where a robot floats in a space while hanging down from a horizontal bar, and separately using the stabilizers according to a confronting condition is also considered. In this case, since seamless motion control cannot be performed, the prospect in the development of applications is not good.

Also, if the stabilizers cannot perform real-time processing due to a large amount of calculation, the solution cannot be applied to an application premising the interactivity of robots or characters in a game.

SUMMARY OF THE INVENTION

Accordingly, it is desirable to provide an excellent control system, a control method, and a computer program which stably control multi-link structures, such as robots and characters, so that the balance of the multi-link structures may not be damaged.

It is also desirable to provide an excellent control system, a control method, and a computer program which deal with a stabilizing standard in a generalized case which is not constrained by specific preconditions.

According to a first embodiment of the present invention, there is provided a control system of a multi-link structure configured by connecting a plurality of rigid bodies together. The control system includes a state equation setting means for setting a state equation which describes the relation between the momentum of a whole system concerning the multi-link structure and a control input; a predictive control target value setting means for setting a control target value from a current time to a future time; a stability evaluation function setting means for setting a stability evaluation function which evaluates the stability of the multi-link structure on the basis of a difference between the target value of a momentum based on the control target value, and an actual momentum; an optimal control input determining means for determining an optimal control input to give a minimum value of the stability evaluation function under constraint conditions configured by the state equation; an optimal momentum calculating means for calculating an optimal momentum to be generated by the optimal control input; and a joint driving method determining means for determining a joint driving method of the multi-link structure for realizing the optimal momentum.

Here, the term "system" includes an object in which a plurality of devices (or functional modules which function particular functions) are logically assembled, and whether or not each device or functional module is within a single housing does not matter particularly (the same hereinbelow).

In an application which deals with a multi-link structure, such as a legged robot or a game character, a stabilizer which stably controls the structure so that the balance thereof may not be damaged is required.

Although a posture stabilization control system of a robot in which the ZMP (Zero Moment Point) is adopted as a stability discrimination standard is widely known, its applicable scope is basically limited to a planar motion (walking), and a general case outside the scope of preconditions, such as a case where right and left legs of the robot do not simultaneously touch a group of planes having different normal vectors cannot be dealt with in the ZMP stability discrimination standard.

On the other hand, in the control system of the embodiment of the present invention, attention was paid to the fact that it is effective as a stabilizing standard that the momentum of a whole system does not diverge for a prolonged period of time, and a stability evaluation function which evaluates the deviation between a translational momentum and an angular momentum was defined. Then, the whole system can be stabilized for a prolonged period of time by determining a control input to minimize the stability evaluation function. A best example that the momentum diverges is when the robot turns over. Conversely, if divergence of the momentum is prevented, a solution that the robot does not turn over will be chosen naturally.

That is, according to the control system according to the embodiment of the present invention, it is possible to provide a real-time solution about a stabilizing standard in a general case which is not constrained by specific preconditions, simply by inputting a schematic future image about a target motion, such as a contact state with an external world, thereby automatically determining details of contact force or momentum so that a whole system may not diverge for a prolonged period of time.

Here, the predictive control target value setting means sets information on a point of action of an external force of the multi-link structure, and specifically information on an external force or external moment of the multi-link structure, as the control target value.

Also, the predictive control target value setting means sets information on the center of gravity, center-of-gravity speed, or momentum of the multi-link structure, and further information on the angular momentum of the multi-link structure, as the control target value.

Also, the stability evaluation function setting means and the optimal momentum calculating means deal with the translational momentum, or angular momentum around the center of gravity or other predetermined points, of the multi-link structure, as the momentum.

Also, the control input to the control system according to the embodiment of the present invention includes a force or moment acting on the multi-link structure, a point of action of a force acting on the whole multi-link structure, and the like.

Also, a stability evaluation function set by the stability evaluation function setting means includes the deviation of the control target value, a control input, and the like.

Also, the control system according to the embodiment of the present invention may further an inequality constraint condition setting means for setting inequality constraint conditions concerning an external force. In this case, the optimal momentum calculating means calculates an optimal momentum under the inequality constraint conditions.

The joint driving method determining means can determine a joint driving method using an operational space inertia inverse matrix concerning the momentum or center of gravity.

Alternatively, the joint driving method determining means can determine a Jacobian determinant concerning the momentum or center of gravity.

Also, the joint driving method determining means can further set constraint conditions other than the momentum, and can determine a joint driving method so as to simultaneously satisfy constraints concerning the momentum and other motion constraints.

Also, according to a second embodiment of the present invention, there is provided a computer program tangibly stored in a computer-readable medium so that control processing of a multi-link structure configured by connecting a plurality of rigid bodies together may be executed on a computer system. Here, the computer program causes the computer system to execute the steps of: setting a state equation which describes the relation between the momentum of a whole system concerning the multi-link structure and a control input; setting a control target value from a current time to a future time; setting a stability evaluation function which evaluates the stability of the multi-link structure on the basis of a difference between the target value of a momentum based on the control target value, and an actual momentum; determining an optimal control input to give a minimum value of the stability evaluation function under constraint conditions configured by the state equation; calculating an optimal momentum to be generated by the optimal control input; and determining a joint driving method of the multi-link structure for realizing the optimal momentum.

The computer program according to a second embodiment of the present invention is a computer program tangibly stored in a computer-readable medium so as to realize predetermined processing on a computer system. In other words, by installing the computer program according to the second embodiment of the present invention in a computer system, a cooperative action can be exhibited, and the same effects as the control system according to the first embodiment of the present invention can be obtained.

According to the embodiments of the present invention, it is possible to provide an excellent control system, a control method, and a computer program which stably control multi-link structures, such as robots and characters, so that the balance of the multi link structures may not be damaged.

According to the embodiments of the present invention, it is also possible to provide an excellent control system, a control method, and a computer program which suitably realize a generalized stabilizing standard which does not depends on a contact state with an external world and a real-time numerical analysis method thereof.

According to the control system according to the embodiments of the present invention, extremely various kinds of motions can be stabilized without depending on a contact state with an external world.

The control system according to the embodiments of the invention is configured on the basis of the fact that it is effective as a stabilizing standard that the momentum of a whole system does not diverge for a prolonged period of time. According to this control system, it is possible to provide a real-time solution about a stabilizing standard in a general case which is not constrained by specific preconditions, simply by inputting a schematic future image about a target motion, such as a contact state with an external world, thereby automatically determining details of contact force or momentum so that a momentum of a whole system may not diverge for a prolonged period of time.

The foregoing and other objects, features and advantages of the present invention will become apparent from embodiments of the present invention as described hereinbelow, and more detailed description based on the accompanying drawings.

BRIEF DESCRIPTION OF THE DRAWINGS

FIG. 8B is a graph showing the result after the stabilizing method according to the embodiment of the present invention is applied to the leaning motion of the legged robot against the wall;

DESCRIPTION OF THE PREFERRED EMBODIMENTS

Hereinafter, embodiments of the present invention will now be described referring to the accompanying drawings.

Figure 1:
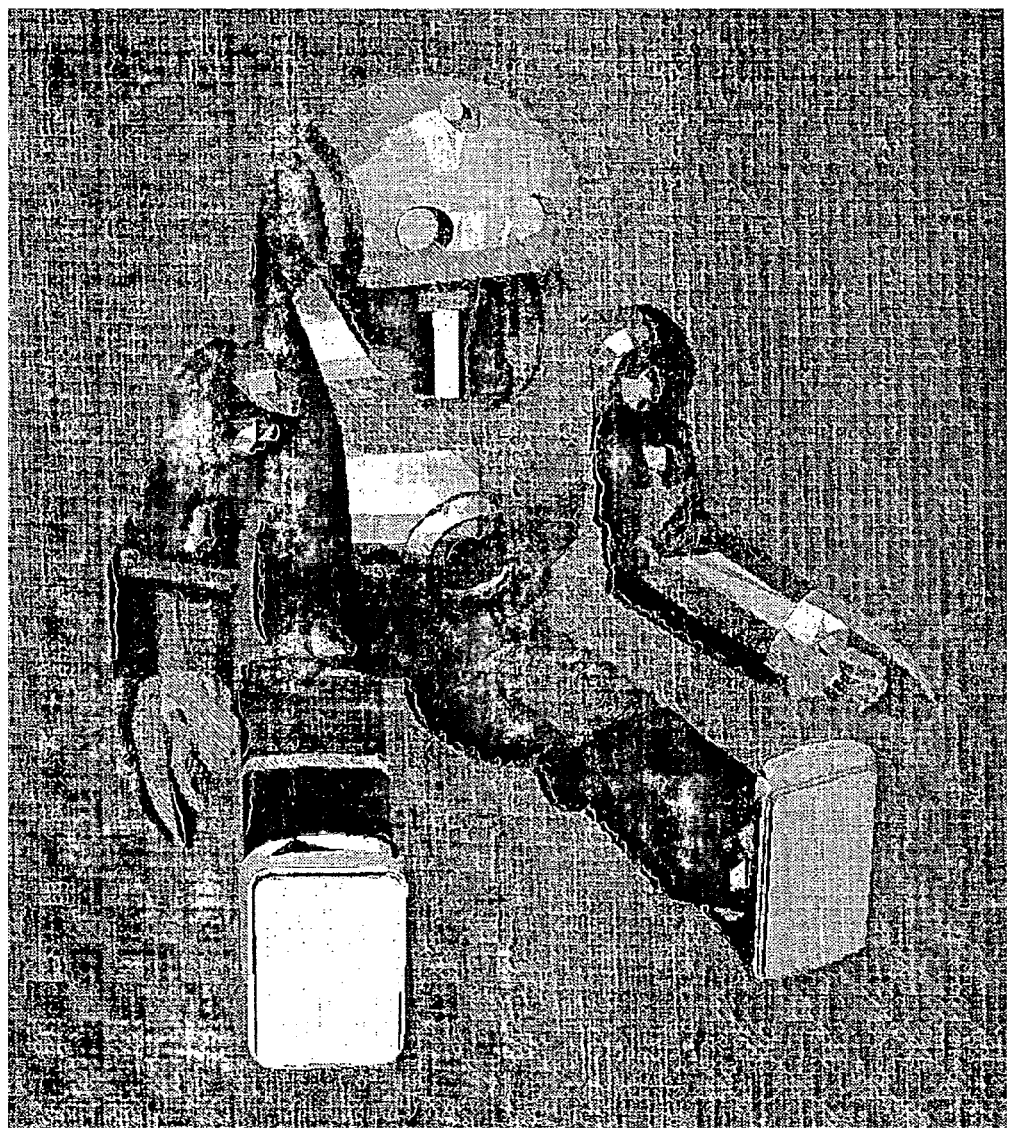
FIG. 1 is a view showing the external configuration of a robot apparatus to which a stabilizing discrimination standard according to an embodiment of the present invention is to be applied.

The external configuration of a robot apparatus to which a stabilizing discrimination standard according to an embodiment of the present invention is to be applied is shown in FIG. 1. The shown robot apparatus is a so-called humanoid robot. Two legs as moving means are connected to a pelvic part of the robot and an upper body is also connected to the pelvic part via a waist joint. Two arm parts are connected to the upper body and a head part is also connected to the upper body via a neck joint.

Each of the left and right legs has a total of six degrees of freedom including three degrees of freedom of a hip joint, one degree of freedom of a knee joint, and two degrees of freedom of an ankle joint. Also, each of the right and left arm parts has a total of six degrees of freedom including three degrees of freedom of a shoulder joint, one degree of freedom of an elbow knee joint, and two degrees of freedom of a wrist joint. Each of the neck joint and the waist joint has three degrees of freedom around the X, Y and Z axes.

An actuator which drives each joint shaft is composed of, for example, a DC brushless motor, a speed reducer, and a position sensor which detects the rotational position of an output shaft of the speed reducer. These joint driving actuators are connected to a host computer which generally controls the operation of the whole robot apparatus and are provided with the position or force control target values thereof from the host computer, and they are adapted to be able to transmit their current output torques, joint angles, or joint angle accelerations.

Figure 2:
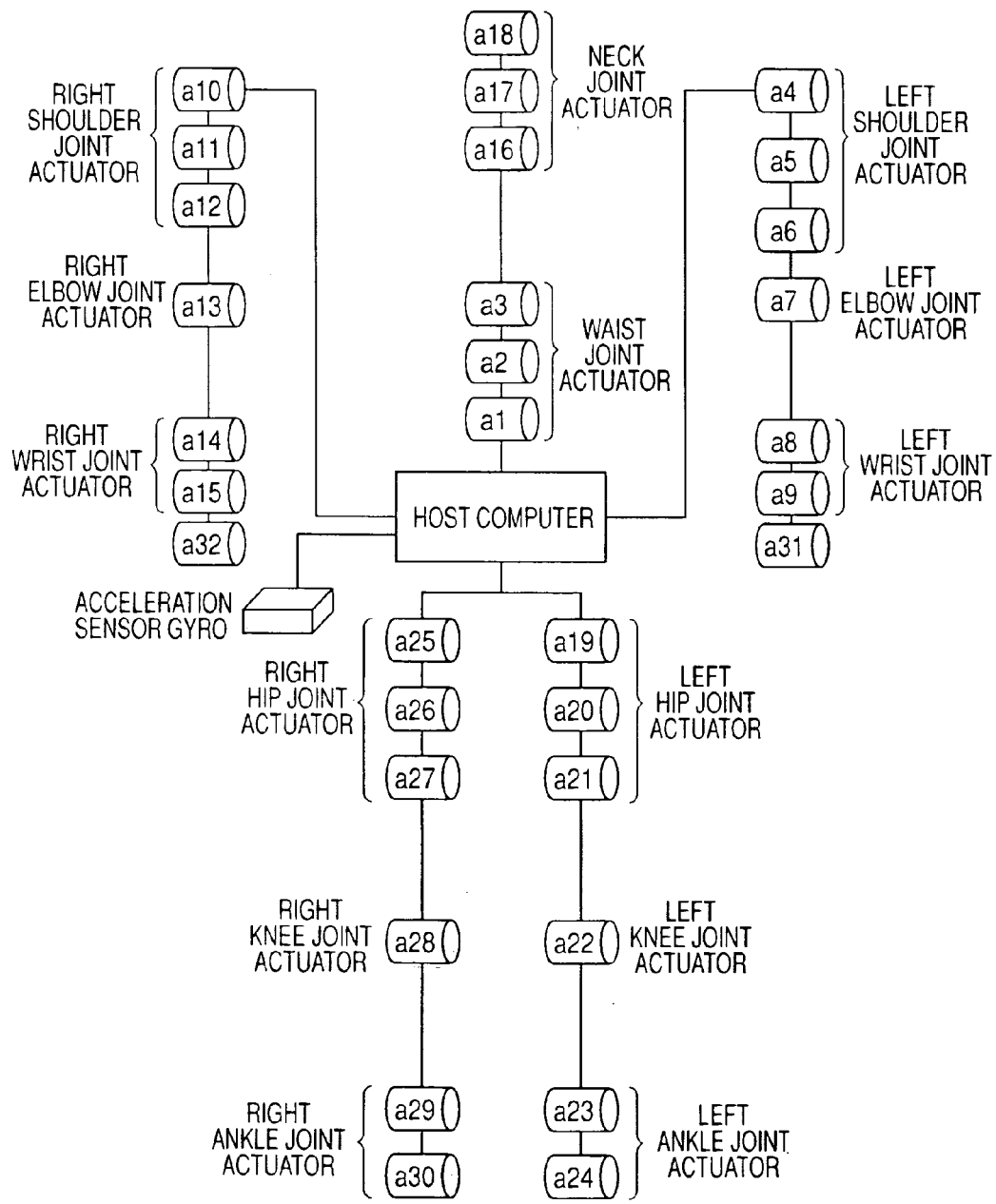
FIG. 2 is a view showing an exemplary configuration of the wiring topology in the robot apparatus shown in FIG. 1.
Figure 3:
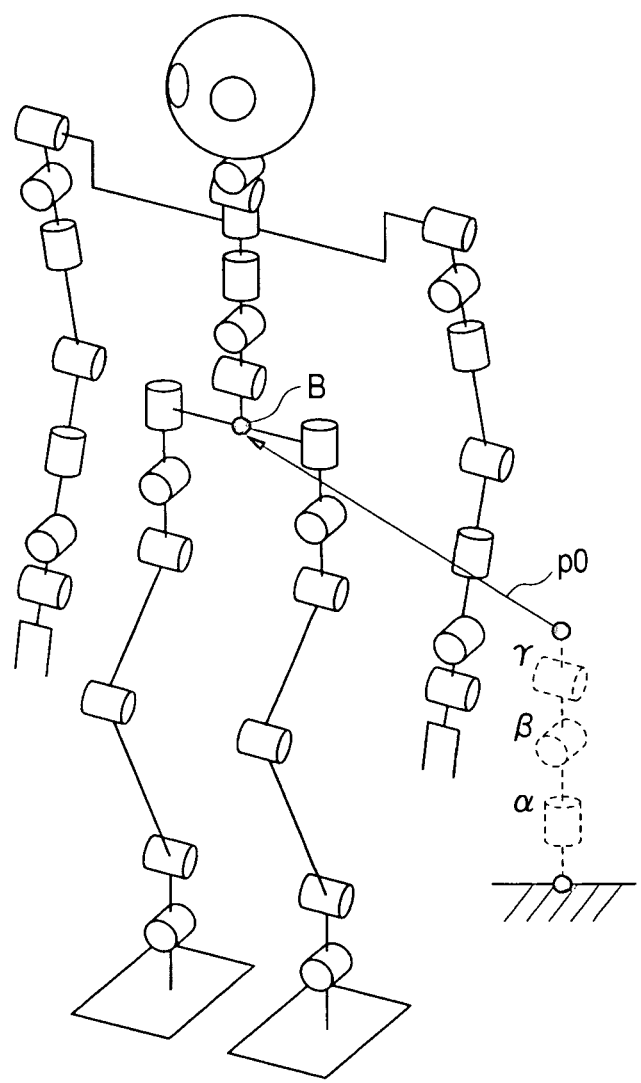
FIG. 3 is a view showing a joint degree-of-freedom model of the robot apparatus shown in FIG. 1.

An exemplary configuration of the wiring topology in the robot apparatus shown in FIG. 1 is shown in FIG. 2. Also, a joint degree-of-freedom model of the robot apparatus in FIG. 1 is shown in FIG. 3.

The robot apparatus has triaxial waist joint actuators a1, a2, and a3, and triaxial neck joint actuators a16, a17, and a18 at its body. These actuators are serially connected to the host computer. Each of the joint actuators receives its position and force control target value through a serial cable, and transmits its current output torque, joint angle, or joint angle acceleration to the host computer.

Also, the robot apparatus has triaxial shoulder joint actuators a4, a5, and a6, a uniaxial elbow joint actuator a7, and biaxial wrist joint actuators a8 and a9 at its left arm part. These actuators are serially connected to the host computer. Similarly, the robot apparatus has triaxial shoulder joint actuators a10, a11, and a12, a uniaxial elbow joint actuator a13, and biaxial wrist joint actuators a14 and a15 at its right arm part. Moreover, the right and left hands of the robot apparatus are provided with yawing-shaft driving actuators a31 and a31. These actuators are serially connected to the host computer.

Also, the robot apparatus has triaxial hip joint actuators a19, a20, and a21, a uniaxial knee joint actuator a22, and biaxial ankle joint actuators a23 and a24 at its left leg part. These actuators are serially connected to the host computer. Similarly, the robot apparatus has triaxial hip joint actuators a25, a26, and a27, a uniaxial knee joint actuator a28, and biaxial ankle joint actuators a29 and a30 at its right leg part. These actuators are serially connected to the host computer.

Each of the actuators a1 to a30 used in the joints is composed of, for example, a DC brushless motor, a speed reducer, and a position sensor which detects the rotational position, speed, and torque of the motor, a speed sensor, and a torque sensor. The actuator is rotationally driven according to its position or force control target value given from outside, and transmit its current output torque, joint angle, or joint angle acceleration. This kind of joint actuator is described in, for example, Publication of JP-A-2004-181613 which has already been assigned to the present applicant.

Each of links connected by the joints is modeled as a rigid link, and holds its physical properties, such as mass, position of the center of gravity, and inertia tensor, other than its geometrical shape.

The connection relation between the links is expressed as an open link tree structure in which a pelvis B is used as a basis. Since the above robot apparatus freely moves in the world space and can be changed in its posture, the posture of the whole robot apparatus is defined by generalized variables shown in the following Expression (1) to which the Euler angle $\alpha=(\alpha, \beta, \gamma)^T$ and position $p_0$ ($p_{0x}$, $p_{0y}$, $p_{0z}$) of the pelvis B as well as all the joint angles $\theta=(\theta 1, \theta 2, \ldots, \theta N)^T$ (provided that N is the number of the joints) are added.

$$q^T = (\theta^T, P_0^T, \alpha^T)^T \tag{1}$$

Then, the dynamic equation of the robot apparatus can be expressed in the form of the following Expression (2).

$$\tau = H\ddot{q} + b - J_{ext}^T f_{ext} \tag{2}$$

Here, "$\tau$" is a generalized force corresponding to a generalized variable q whose components corresponding to $\alpha$ and $p_0$ becomes 0 (zeros) (because an actuator which generates force does not exist), and whose component corresponding to $\theta$ is equal to the force generated by an actuator which drives each joint. "H" represents a whole inertia matrix of robot, and "b" represents gravity, Coriolis force, or the like. "$f_{ext}$" is an external force. "$J_{ext}$" is a Jocobian determinant which correlates a speed which is generated in a direction in which the external force acts, with a generalized speed that is the temporal differentiation of the generalized variable q.

The present inventors have paid attention to the fact that it is effective as a stabilizing standard that the momentum of a whole system does not diverge for a prolonged period of time. Accordingly, considering the detailed dynamics like the above Expression (2) in stabilizing the above-described system will be put aside for the moment, and stabilizing the momentum possessed by the whole system of Expression (2) will first be considered.

Figure 4:
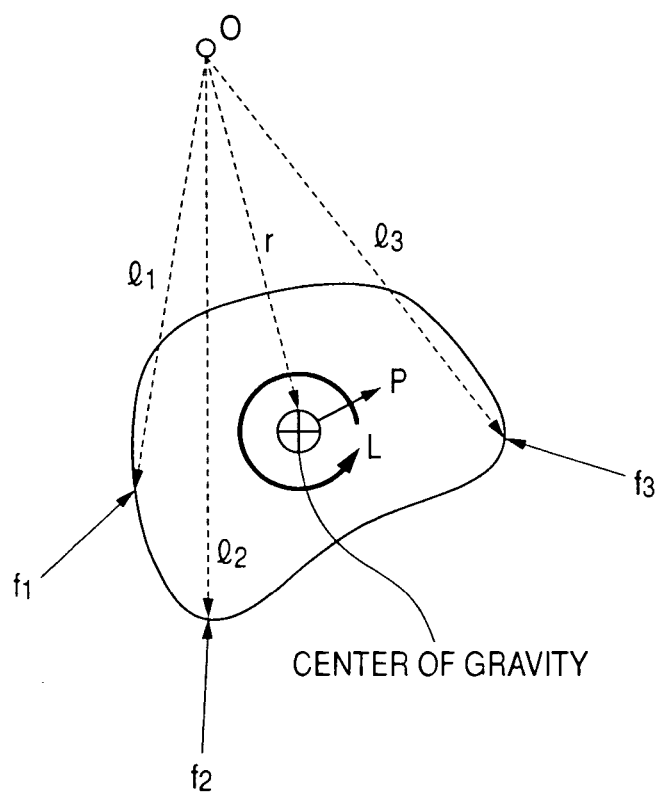
FIG. 4 is a view showing an external force $f_i$ received by each point of action $l_i$ of a system.

The momentum of the whole system can be expressed by translational momentum P and angular momentum L around the center r of gravity. If an external moment from an environment is defined as "$n_j$", and an external force at an i-th point $l_i$ of application is defined as "$f_i$" (refer to FIG. 4), the dynamic equation can be expressed like the following Expression (3). Here, "M" represents the total weight of the robot apparatus, and "g" represents the acceleration of gravity.

$$\frac{d}{dt}\begin{pmatrix}P\\L\end{pmatrix} = \begin{pmatrix}\Sigma f_i + Mg\\\Sigma(l_i - r) \times f_i + \Sigma n_j\end{pmatrix} \tag{3}$$

Here, if the relation of the following Expression (4) is added, the above Expression (3) can be collected like the following Expression (5).

$$M\dot{r} = P \tag{4}$$

$$\frac{d}{dt}\begin{pmatrix}P\\L\\r\end{pmatrix} = \begin{pmatrix}\Sigma f_i + Mg\\\Sigma(l_i - r) \times f_i + \Sigma n_j\\P/M\end{pmatrix} \tag{5}$$

Here, the following "x" is considered as a state variable.

$$x = \begin{pmatrix}P\\L\\r\end{pmatrix} \tag{6}$$

Also, the following "u" is considered as a control input.

$$u = \begin{pmatrix}f_1\\f_2\\\vdots\\n_1\\n_2\\\vdots\end{pmatrix} \tag{7}$$

Also, the following "y" is considered as an output variable (the output variable is composed of some components of the state variable).

$$y = \begin{pmatrix} P \\ L \end{pmatrix} \quad (8)$$

Then, the state equation shown in the above Expression (5), and the output equation shown in the above Expression (8) can be expressed like the following expressions, respectively.

$$\dot{x} = \phi(x, u, t) \quad (9)$$

$$y = Cx \quad (10)$$

Here, the matrix C and the function $\phi(x, u, t)$ are defined as follows.

$$C = \begin{pmatrix} 1 & 0 & 0 \\ 0 & 1 & 0 \end{pmatrix} \quad (11)$$

$$\phi(x, u, t) = \begin{pmatrix} \Sigma f_i + Mg \\ \Sigma(l_i - r) \times f_i + \Sigma n_j \\ P/M \end{pmatrix} \quad (12)$$

In a case where the fact that the momentum of the whole system does not diverge for a prolonged period of time is adopted as a stabilizing standard, the whole system can be considered to be stable for a long time if the control input is determined so as to minimize a stability evaluation function E shown in the following Expression (13), with the state equations of the system expressed by the above Expressions (9) and (10) being used as constraint conditions.

$$E = \frac{1}{2} \int_0^T \{y(T) - y_{ref}(T)\}^T F\{y(T) - y_{ref}(T)\} + \quad (13)$$

$$\{y(t) - y_{ref}(t)\}^T Q(t)\{y(t) - y_{ref}(t)\} +$$

$$u(t)^T R(t) u(t) dt$$

A first term on the right side of the above Expression (13) evaluates whether or not translational momentum and angular momentum after T seconds from a current time converges into a target value. Also, a second term on the right side of the above Expression evaluates whether or not the translational momentum follows a target momentum over the whole integral interval [0, T]. Also, a third term on the right side of the above Expression evaluates whether or not a larger external force acts. That is, the above stability evaluation function E provides a generalized stability discrimination standard in which the fact that the deviation of the momentum (output variable) of the whole system, and the control input do not diverge in an interval from a current time t=0 to a future time t=T is defined as a stabilization condition. A best example that the momentum diverges is when the robot turns over. Conversely, if the content that the momentum diverges is adopted, a solution that the robot does not turn over will be chosen naturally.

Under the nonlinear time-variant constraint conditions as shown in the above Expressions (9) and (10), the problem of minimizing the evaluation function like the above Expression (13) is generally classified into a problem called 'Nonlinear Receding Horizontal Control'. A method of solving the problem about the nonlinear receding horizontal control without including convergence operation is described in, for example "Time Variant Receding Horizontal Control of Nonlinear Systems" (Journal of Guidance, Control and Dynamics, Vol. 21 No. 1, pp. 174 to 176, 1998) written by T. Otsuka. According to this method, although the amount of calculation is large, the control input can be obtained in real time in principle. However, taking not a general nonlinear problem but a simplified problem as an example in the present specification so that the above system may be handled as a time-variant linear system, one numerical analysis method of this problem will be shown.

Figure 5:
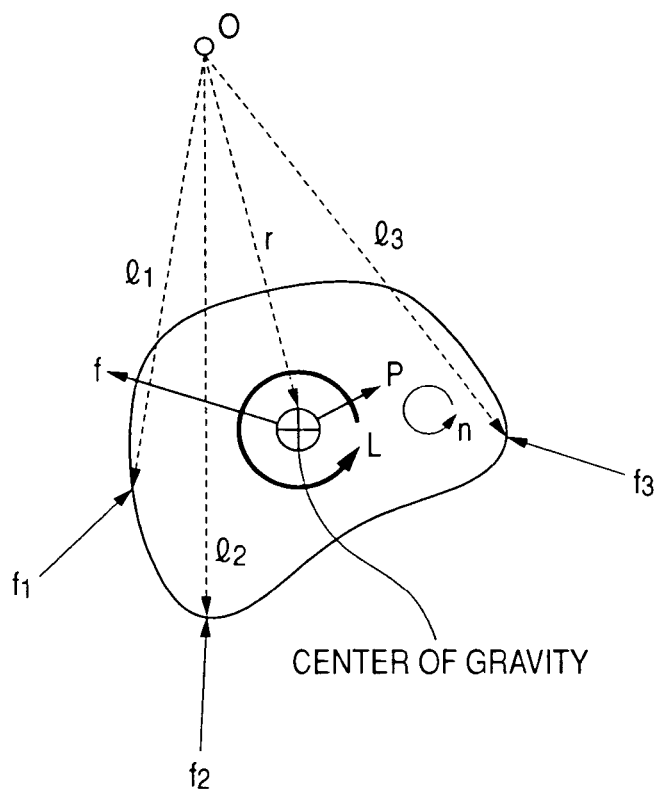
FIG. 5 is a view showing a state where an external moment $n_j$ does not act, the external force $f_i$ is known, and a translational force f and a moment n are input to the whole system.

In the above Expression (5), it is assumed that the external moment $n_j$ does not act, and the external force $f_i$ is known. Here, it is assumed that the value of $f_i$ is not a right value, but an approximate value. In order to adjust an error between the right value and the approximate value, a problem of minimizing momentum by inputting the translation force f and the moment n to the whole system is considered (refer to FIG. 5). The "f" and "n" can also be substituted with the summation of fine adjustment values to be added to the external force $f_i$ and the action point $l_i$ thereof. At this time, the constraint expression (5) is modified as follows.

$$\frac{d}{dt} \begin{pmatrix} P \\ L \\ r \end{pmatrix} = \begin{pmatrix} f + \Sigma f_i + Mg \\ n + \Sigma(l_i - r) \times f_i \\ P/M \end{pmatrix} \quad (14)$$

The above expression is arranged like the following Expression (15).

$$\frac{d}{dt} \begin{pmatrix} P \\ L \\ r \end{pmatrix} = \begin{pmatrix} 0 & 0 & 0 \\ 0 & 0 & \Sigma f_i \times \\ 1/M & 0 & 0 \end{pmatrix} \begin{pmatrix} P \\ L \\ r \end{pmatrix} + \begin{pmatrix} 1 & 0 \\ 0 & 1 \\ 0 & 0 \end{pmatrix} \begin{pmatrix} f \\ n \end{pmatrix} \begin{pmatrix} \Sigma f_i + Mg \\ \Sigma l_i \times f_i \\ 0 \end{pmatrix} \quad (15)$$

Here, the control input is changed like the following Expression (16).

$$u = \begin{pmatrix} f \\ n \end{pmatrix} \quad (16)$$

Then, the constraint expression (15) is expressed as follows.

$$x\ddot{} = Ax + Bu + d \quad (17)$$

Here, the matrixes A and B, and the vector d become as follows.

$$A = \begin{pmatrix} 0 & 0 & 0 \\ 0 & 0 & \Sigma f_i \times \\ 1/M & 0 & 0 \end{pmatrix} \quad (18)$$

$$B = \begin{pmatrix} 1 & 0 \\ 0 & 1 \\ 0 & 0 \end{pmatrix} \quad (19)$$

-continued $$d = \begin{pmatrix} \Sigma f_i + Mg \\ \Sigma l_i \times f_i \\ 0 \end{pmatrix} \quad (20)$$

The constraint condition shown in the above Expression (15) is a time-variant linear system which is easy in the configuration of a numerical analysis method. If a condition which minimizes the evaluation function shown in the above Expression (13) is found under the constraint conditions (15) and (10) using the Pontryagin's Maximum Principle, the result becomes as follows.

$$\dot{x} = Ax + Bu + d \quad (21)$$

$$\dot{\xi} = -C^T Q(y - y_{ref}) - A^T \xi \quad (22)$$

$$u = -R^{-1} B^T \xi \quad (23)$$

$$\xi(T) = C^T F[y(T) - y_{ref}(T)] \quad (24)$$

"ζ" is a concomitant state vector. If a form that becomes linear with respect to a state variable x like the following Expression (25) is assumed as "ζ", "K" and "h" constitute boundary problems of the differential equations as shown in the following Expressions (26) to (29).

$$\xi = Kx + h \quad (25)$$

$$\dot{K} = [-A^T + KBR^{-1}B^T]K - KA - C^T QC \quad (26)$$

$$\dot{h} = [-A^T + KBR^{-1}B^T]h + C^T Q y_{ref} - Kd \quad (27)$$

$$K(T) = C^T(T) F C(T) \quad (28)$$

$$h(T) = C^T(T) F y_{ref}(T) \quad (29)$$

The above Expression (26) is known as the Riccati Expression. In these differential equations, a numerical solution can be obtained by executing backward numerical integration (backward sweep) towards T=0 from t=T. This makes it possible to obtain K(0) and h(0). Subsequently, ζ(0) can be calculated by assigning the K(0) and h(0) to Expression (5), and then a control input u(0) at the current time t=0 can be obtained by assigning the ζ(0) to Expression (23). The state vector x in the next time dt is obtained by assigning the u(0) to Expression (21) and then executing numerical integration.

From the above, the translation force f and moment n of fine adjustment values as control inputs at a present time for minimizing momentum can be obtained, and as a result, momentums P(dt) and L(dt) at the next time will be obtained. Here, "dt" represents a control period.

Subsequently, the joints are driven in consideration of the kinematics and mass properties of the whole body of the robot so as to meet the momentums P and L obtained for every control period in the manner as described above.

For example, a whole body cooperation control system can be configured on the basis of operational space control. The operation space is a space for describing the relation between the force acting on an object and acceleration generated. The operation space is given by a matrix called an operational space inertia inverse matrix, and a relational expression between the acceleration and force of the operational space can be described using the operational space inertia inverse matrix and an operational space physical quantity, such as an operational space bias acceleration.

As shown in the above-mentioned Expression (2), the dynamic equation of a whole link structure configured by connecting a plurality of rigid bodies, such as legged robots or CG characters, can be expressed in the form of the following Expression (30).

$$\tau = H\ddot{q} + b - J_0^T f_0 \quad (30)$$

Here, "τ" is a generalized force corresponding to a generalized variable q, and "b" is gravity or Coriolis force, "$f_0$" is an external force acting on an operational space, and "H" is an inertia matrix for a joint space of the whole structure, and $J_0$ is a Jacobian determinant which defines the operational space. In a link structure in which rigid bodies are connected together via joints, the vectors which consecutively generate all the values of the joints are expressed by the generalized variable q.

The operational space is basically given by a matrix called an operational space inertia inverse matrix. That is, the operational space inertia inverse matrix, which is a method of expression for correlating force with acceleration, is defined as a matrix $\Lambda^{-1}$ shown in the following Expression (31). Here, "H" is an inertia matrix for the joint space of the whole structure.

$$\Lambda^{-1} = J_0 H^{-1} J_0^T \quad (31)$$

Using the operational space inertia inverse matrix $\Lambda^{-1}$, the above Expression (30) can be modified as follows.

$$\ddot{x} = \Lambda^{-1} f_0 + c_0 \quad (32)$$

The left side of the above Expression represents the acceleration which is generated in the operational space. Here, "$c_0$" is an operational space bias acceleration (the acceleration which is generated in the operational space when an external force does not act), and is expressed like the following expression.

$$c = J_0 H^{-1}(\tau - b) + \dot{J}_0 \dot{q} \quad (33)$$

The operational space inertia inverse matrix $\Lambda^{-1}$ is a matrix which correlates the force and acceleration at a certain part, and is an important physical quantity which enables application to many fields, such as force control, dynamic simulation, computer animation, posture editing, and external force estimation.

If the operational space inertia inverse matrix $\Lambda^{-1}$ is calculated as defined, there is a problem in that real-time processing is not performed because the inertia matrix H for the joint space of the whole structure intervenes, and this causes wasteful calculation, which leads to a huge amount of calculation. In contrast, the operational space inertia inverse matrix $\Lambda^{-1}$ can be calculated at high speed and the load of the calculation can be reduced by applying forward dynamic operation which obtains a generalized acceleration (joint acceleration) from a generalized force (joint force) of a link structure. Refer to, for example, the specification of Japanese Patent Application No. 2005-298090 which has already been assigned to the present application about a high-speed calculation of the operational space inertia inverse matrix $\Lambda^{-1}$.

In a case where the whole body cooperation control of a link structure is realized by force control using the operational space control, since the dimension of constraints becomes basic acceleration, it is necessary to express constraints concerning momentum by differences therebetween. That is, if momentums at a current time are defined as P and L, it is necessary to solve the following simultaneous equations.

$$\begin{pmatrix} \vdots \\ (P-P_0)/dt \\ \vdots \\ (L-L_0)/dt \\ \vdots \end{pmatrix} = \Lambda^{-1} f_0 + C_0 \quad (34)$$

As the operational space, not only momentum but also a constraint concerning contact with an environment, a constraint of a joint movable range, and the like are simultaneously are considered. There is a case that these also include an inequality constraint. Generally, the above Expression (34) is solved as the linear complementary problem (for example, a case where the force from a floor does not act in a pulling direction, or the like, corresponds to the inequality constraint). The method of calculating a center-of-gravity operational space described in the specification (as mentioned previously) of Japanese Patent Application No. 2005-298090 can be applied to a method of calculating an operational space inertia inverse matrix $\Lambda^{-1}$ and a bias acceleration in a case where a translational momentum is used as an operational space (because the translational momentum just multiplies the speed of the center of gravity by M). Since a method of calculating an operational space inertia inverse matrix $\Lambda^{-1}$ and a bias acceleration in a case where angular momentum is used as an operational space is also described in the specification of Japanese Patent Application No. 2005-298090, refer to this. By solving this problem, it is possible to obtain a solution in which momentum constraints imposed by a stability standard, i.e., detailed constraints concerning body properties of link structures, such as legged robots or CG characters, are taken into consideration.

Finally, the obtained operational space force $f_0$ may be converted into an actuator-generated force according to the following Expression.

$$\tau = S J_0^T f_0 \quad (35)$$

Here, "S" is a selection matrix. As the selection matrix, a diagonal matrix in which only elements of generalized variables which cannot generate any force become 1 is used. In a case where only virtual joints $p_0$ and $\alpha$ cannot generate any force, the selection matrix becomes as follows.

$$S = \text{diag}(1, \ldots, 1, 0, 0, 0, 0, 0, 0) \quad (36)$$

Even in a case where the actuators are of a position control type, a whole body cooperation motion can be realized by using geometrical constraints. For example, a motion control device which realizes a whole body cooperation motion by imposing proper constraint conditions to a whole robot in response to constraint demands generated at the time of execution of a motion to thereby determine the position driving amount of each driving part which is enough to meet all the constraint conditions is disclosed in Publication of JP-A-2004-306231 which has already been assigned to the present applicant. That is, constraints concerning momentum are reflected like the following expression.

$$\begin{pmatrix} \vdots \\ P \\ \vdots \\ L \\ \vdots \end{pmatrix} = J_t \dot{q} \quad (37)$$

$J_t$ is obtained by arraying Jacobian determinants in a row direction. Since a method of calculating a translational momentum Jacobian determinant and an angular momentum Jacobian determinant is described in Publication of JP-A-2004-306231, refer to this. After the equation shown in the above Expression (37) is solved by performing temporal differentiation on the generalized variable q, the solution may be reflected on the position command value of an actuator.

Figure 6:
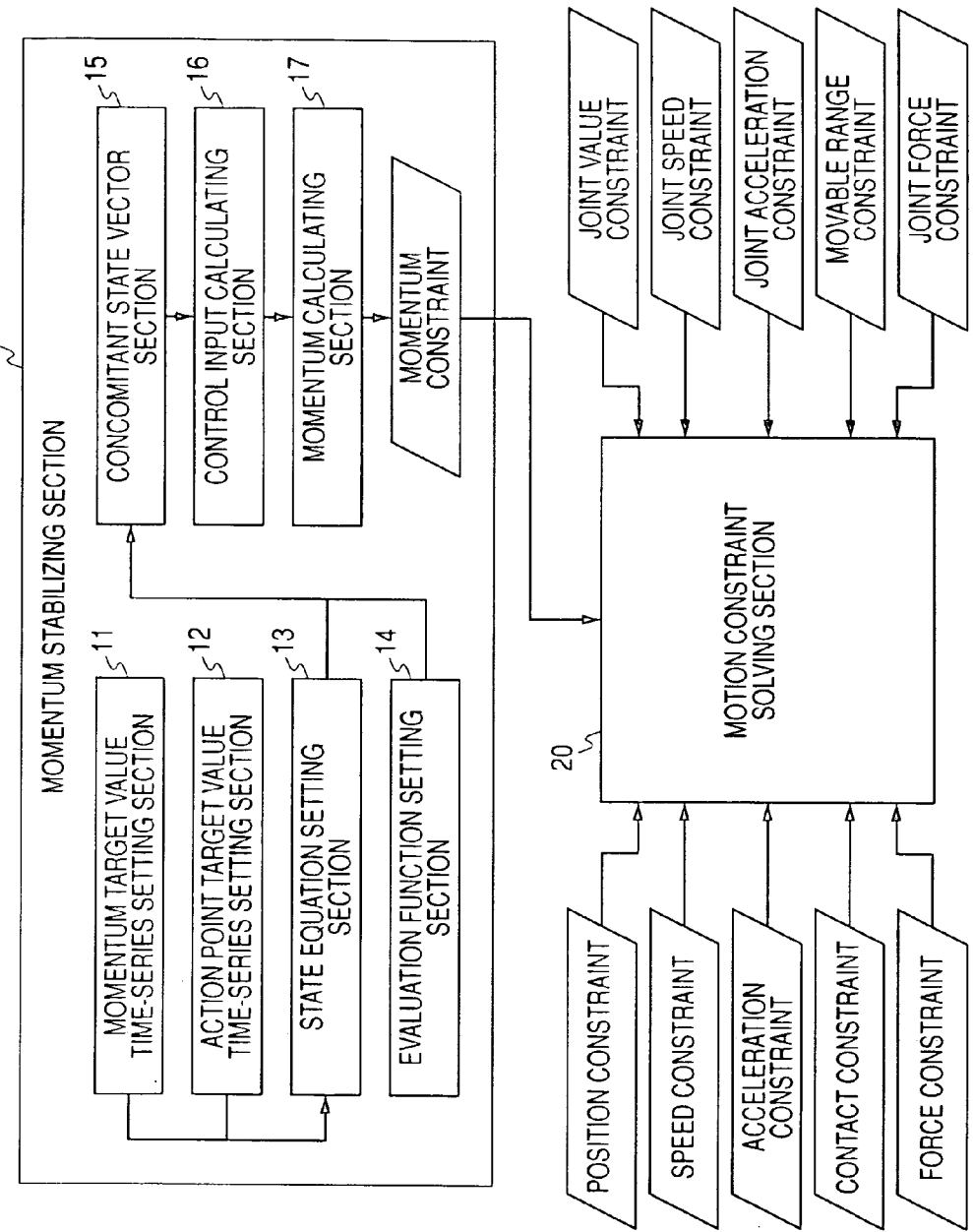
FIG. 6 is a view schematically showing the functional configuration of a system which realizes the stabilizing processing according to the embodiment of the present invention.

The functional configuration of a system which realizes the stabilizing processing according to the embodiment of the present invention is schematically shown in FIG. 6. The shown system is composed of a momentum stabilizing section 10 and a motion constraint solving section 20. The momentum stabilizing section 10 takes charge of the essence of the generalized stabilizing processing which has been described in detail hitherto. The motion constraint solving section 20 determines a command value to each joint for cooperatively driving a whole body so that a command value concerning a calculated momentum may be input to the motion constraint solving section 20 and may be compatible with other constraint conditions.

The momentum stabilizing section 10 includes a momentum target value time-series setting section 11, an action point target value time-series setting section 12, a state equation setting section 13, an evaluation function setting section 14, a concomitant state vector section 15, a control input calculating section 16, and a momentum calculating section 17.

The momentum target value time-series setting section 11 sets a target value ($y_{ref}(t)$ of the above Expression 13)) of the momentum from a current time (t=0) to a future time (t=T). Although the target value of the momentum is set in depending on the purpose of a motion, it is zero in most cases. Also, in a case where the purpose of a motion is hanging down from a horizontal bar, a target value is set even to each momentum.

The action point target value time-series setting section 12 sets a target value ($l_i(t)$ in the above Expression (14)) of an action point from the current time (t=0) to the future time (t=T). Specifically, target values of an action point are set in time series on the basis of the motion data of multi-link structures, such as robots or characters.

The state equation setting section 13 sets the information which is required for calculation of Expressions (18), (19), and (20) relating to the state equation in the above Expression (21).

The evaluation function setting section 14 sets the weighting matrixes F, Q(t), and R(t) in the above Expression (13), and defines an evaluation function. Generally, Q(t) and R(t) also become time-variant functions from the current time (t=0) to the future time (t=T).

The concomitant state vector section 15 solves the differential equations (26) to (29) relating to K and h, obtains a numerical solution of K and h from the current time (t=0) to the future time (t=T), and then calculates the concomitant state vector $\zeta(0)$ at the current time t=0, using the above Expression (25).

The control input calculating section 16 calculates a control input u(0) at the current time t=0, using the above Expression (23).

The momentum calculating section 17 finds a state variable speed at the current time t=0, using the above Expression (21), and then performs numerical integration of the found state variable speed to obtain the target values P(dt) and L(dt) of momentums at x(dt), i.e, at the next time.

The motion constraint solving section 20 determines a driving method of joints, i.e., a whole body cooperation method which is satisfied simultaneously with other motion constraints to thereby output the momentum target values P(dt) and L(dt) at the next time, which are obtained by the momentum stabilizing section 10 in the manner as described above, as joint command values. The expression "other motion constraints" includes, for examples, specifying the force, position, speed, and acceleration to be generated in a part of the body, specifying contact constraints with an external world, and specifying joint generation force, joint value, joint speed, joint acceleration, and movable range constraints. If the joint actuators are force-control-type joint actuators, the operational space control (as mentioned previously) can be used as the whole body cooperation method (for example, refer to the specification of Japanese Patent Application No. 2005-298090). Also, if the joint actuators are position-control-type joint actuators, the generalized reverse kinematics (as mentioned previously) can be used (for example, refer to Publication of JP-A-2004-306231).

Figure 7:
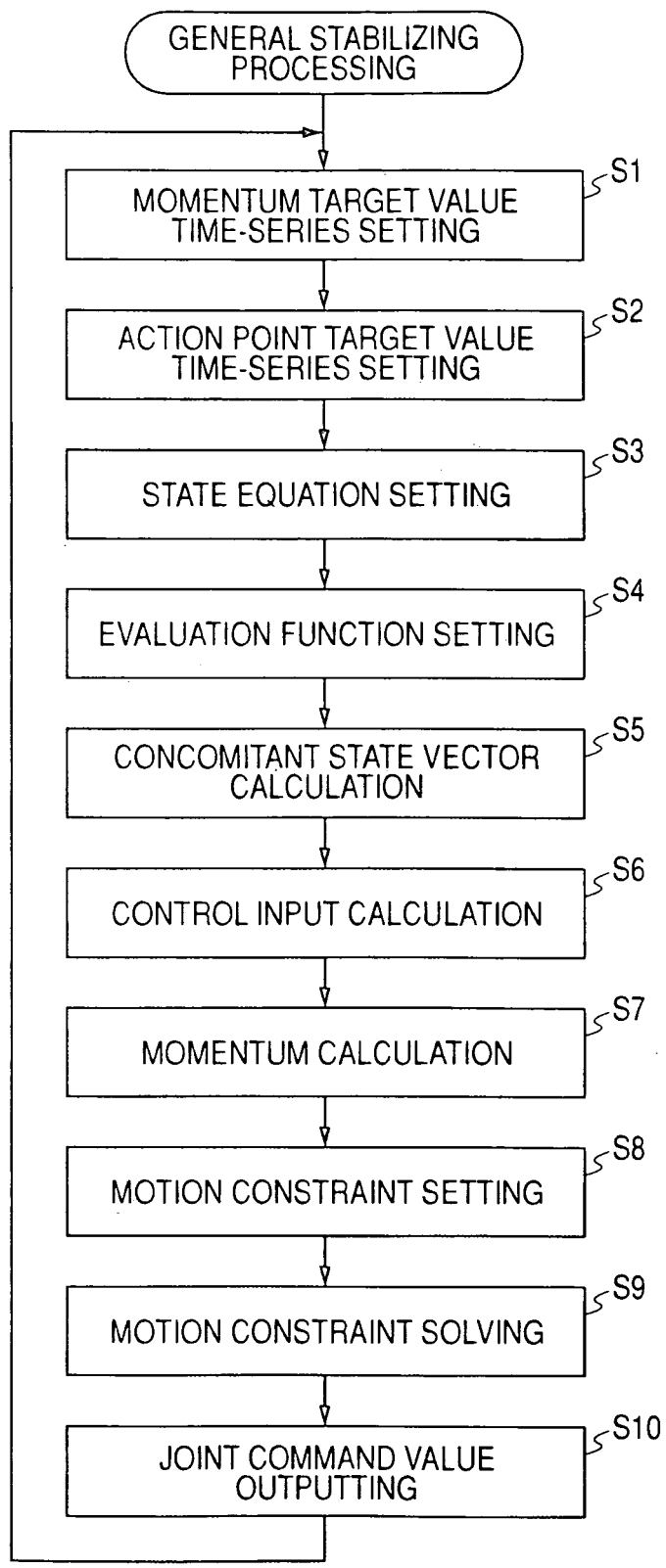
FIG. 7 is a flowchart showing the sequence of the stabilizing processing by the system shown in FIG. 6.

The sequence of the stabilizing processing by the system shown in FIG. 6 is shown in the form of a flowchart in FIG. 7.

First, in the momentum target value time-series setting section 11, the target value ($y_{ref}(t)$ in the above Expression (13)) of the momentum from a current time (t=0) to a future time (t=T) is set (Step S1).

Next, in the action point target value time-series setting section 12, the target value ($l_i(t)$ in the above Expression (14)) of an action point from the current time (t=0) to the future time (t=T) is set (Step S2).

Next, in the state equation setting section 13, the information which is required for calculation of Expressions (18), (19), and (20) relating to the state equation in the above Expression (21) is set (Step S3).

Next, in the evaluation function setting section 14, the weighting matrixes F, Q(t), and R(t) in the above Expression (13) is set and an evaluation function is defined (Step S4).

Next, in the concomitant state vector calculating section 15, the differential equations (26) to (29) relating to K and h are solved, a numerical solution of K and h from the current time (t=0) to the future time (t=T) is obtained, and then the concomitant state vector $\zeta(0)$ at the current time t=0 is calculated using the above Expression (25) (Step 5).

Next, in the control input calculating section 16, a control input u(0) at the current time t=0 is calculated using the above Expression (23) (Step S6).

Next, in the momentum calculating section 17, a state variable speed at the current time t=0 is found using the above Expression (21), and then numerical integration of the found state variable speed is performed to obtain the target values P(dt) and L(dt) of momentums at x(dt), i.e, at the next time (Step S7).

In the motion constraint solving section 20, the momentum target values P(dt) and L(dt) at the next time, and other motion constraints are set (Step S8). Then, joint command values which simultaneously satisfy the set motion constraints is determined (Step S9). The calculated joint command values are output to each of the joint actuators (Step S10).

The system shown in FIG. 6 repeatedly executes the stabilizing processing as described above for every control period dt.

The above-described stabilizing method can realize stabilizing processing of a multi-link structure under such general preconditions that the structure move while simultaneously touching a plurality of planes having different normal vectors, which cannot be dealt with in the ZMP stability discrimination standard. It is a matter of course that a stabilized walking pattern can be calculated as a momentum target track by selecting the point of action of an external force as one point, and using time-series target values of this point as a ZMP-planned track.

Also, although the angular momentum around the center of gravity is used as angular momentum in the above-described embodiment, even if the angular momentum around a point p other than the center of gravity is dealt with in practicality, the stabilizing processing can be performed similarly. In that case, the state equation of the system is simplified like the following Expression (38) instead of the above Expression (5).

$$\frac{d}{dt}\begin{pmatrix} P \\ L \\ r \end{pmatrix} = \begin{pmatrix} \Sigma f_i + Mg \\ \Sigma(l_i - p) \times f_i + (r - p) \times Mg + \Sigma n_j \\ P/M \end{pmatrix} \quad (38)$$

This problem in which the state equation of the system is simply modified can be solved similarly to the above. That is, the problem of minimizing the evaluation function of Expression (13) just have to be solved according to the above-described method under the constraint conditions of the above Expression (38) and (10).

Also, as the external force, generally, constraints of an inequality, such as "pulling force", "pushing force", and "force within a friction cone" are imposed. Even in such a more generalized case, the above problem can essentially be formulated as a problem similar to the above and then solved. That is, under the constraint conditions (9) and (10) based on the state equation of the system, and the following inequality constraint, the problem of minimizing the evaluation function of Expression (13) just have to be solved.

$$Du + e \leq 0 \quad (39)$$

Although the amount of calculation is large, a method such as quadratic programming or introducing a slack variable to the receding horizon control adapted to deal with equality constraints can be used as a specific numerical analysis method.

Figure 8A:
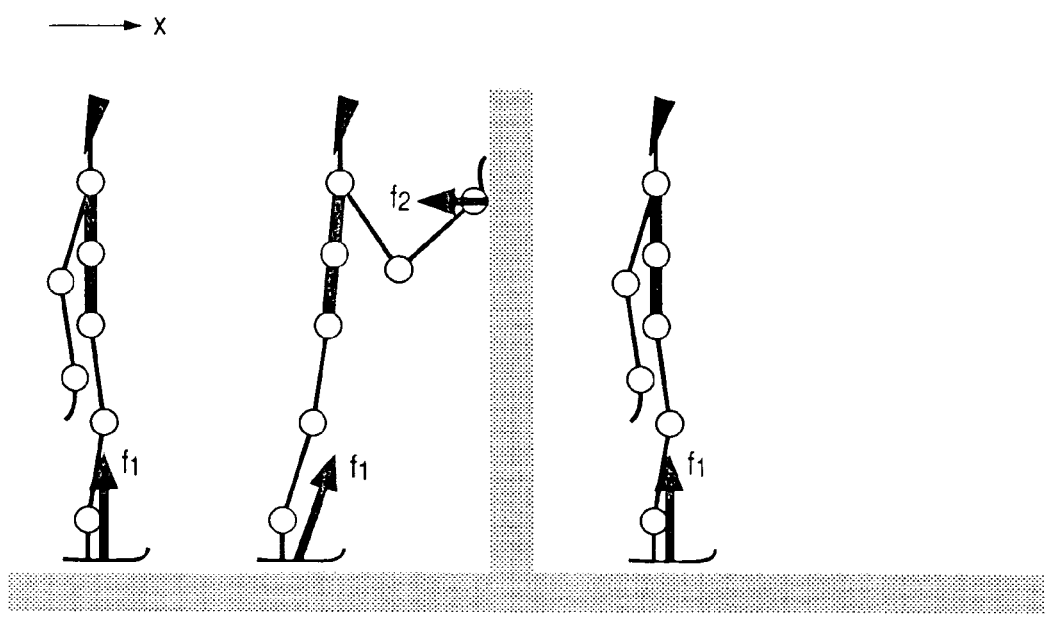
FIG. 8A is a view showing a state where the stabilizing method according to the embodiment of the present invention is applied to a leaning motion of a legged robot against a wall.

The result after the stabilizing method according to the embodiment of the present invention is applied to a leaning motion of a legged robot against a wall is shown in FIGS. 8A and 8B. In this case, approximate values of a reaction force $f_1$ from the floor and a reaction force $f_2$ from the wall are given as target values, and a future estimation value till two seconds later for every control period is given. Only x components of the estimation values are shown in the graph of $f_1$ and $f_2$ of FIG. 8B. Also, an x component of a center-of-gravity track obtained as the result of the stabilization is shown at a lowermost stage of FIG. 8B. It can be understood from this graph that the robot leans forward without divergence of the center of gravity and then returns to its original position again by performing the stabilization.

Figure 9A:
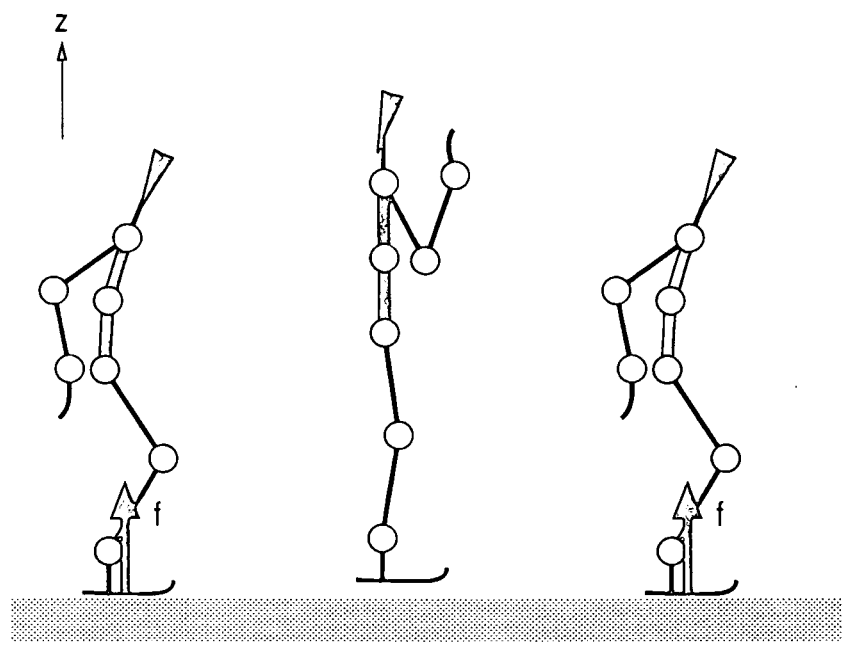
FIG. 9A is a view showing a state where the stabilizing method according to the embodiment of the present invention is applied to stabilization of a jumping movement of a legged robot.
Figure 9B:
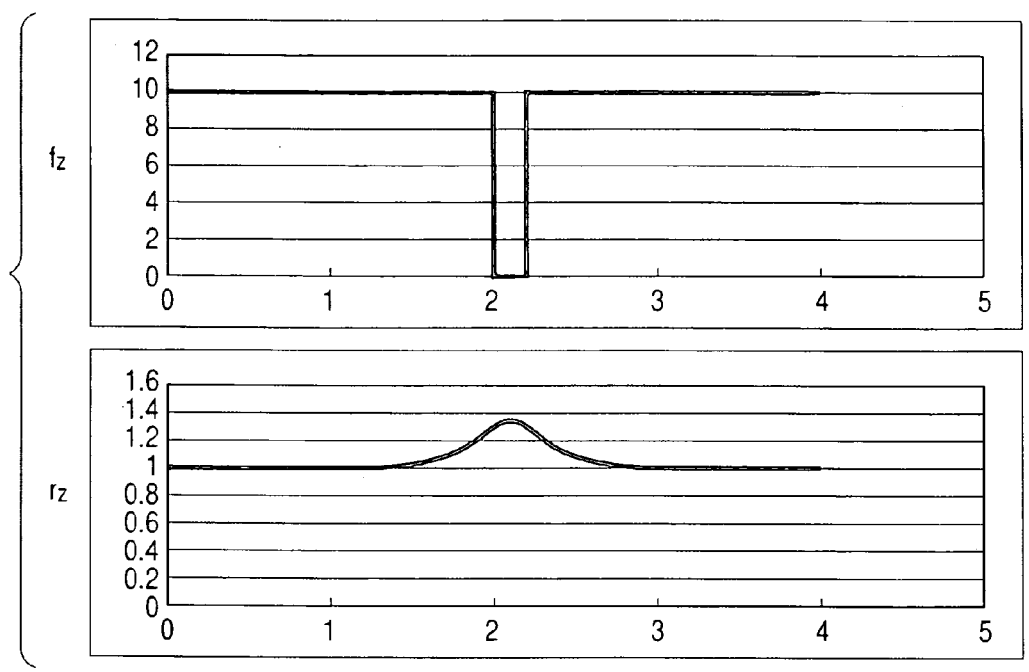
FIG. 9B is a view showing the result after the stabilizing method according to the embodiment of the present invention is applied to the stabilization of the jumping movement of the legged robot.

The result after the stabilizing method according to the embodiment of the present invention is applied to a jumping motion of a legged robot is shown in FIGS. 9A and 9B. In this case, an approximate value of a reaction force f from the floor is given as a target value, and a future estimation value till two seconds later for every control period is given. In addition, in a period corresponding to the non-grounding period, B is also given as a time variable so as to become B=0 (that is, the control input is zero). This is because, in the non-grounding period, the action of an external force from outside is not allowed and the action of both the external force f and the external moment n is not allowed. Therefore, the stabilization is performed with only f and n in an installation period as inputs. A z component of a floor reaction force target value is shown in a graph of $f_z$ of FIG. 9B. Also, a z component of a center-of-gravity track obtained as the result of the stabilization is shown at a lowermost stage of FIG. 8B. It can be understood from this graph that the robot separates from the floor or touches the floor without divergence of the center-of-gravity track, as a result of the stabilization.

As described above, according to the stabilizing method according to the embodiment of the present invention, extremely various kinds of motions can be stabilized without depending on a contact state with an external world.

In addition, although not mentioned in the present specification, a more robust control system reflected an actual motion state can be configured efficiently by giving a motion state measured from a sensor as a compulsory item or boundary condition of the above Expression (5), similarly to JP-A-2004-142095.

As apparent from above, according to the stabilizer according to the embodiment of the present invention, a ripple effect that it becomes possible to expand the working content or activity region of a robot or to systematically perform the stabilization of a character within a dynamic simulator can be expected.

The present invention has been described in detail hitherto referring to particular embodiments. However, it will be obvious to those skilled in the art that modifications or substitutions of the embodiments may be made without departing from the scope of the present invention.

Although the embodiments in which whole body cooperation control is performed on a legged robot have been mainly described in the present specification, the spirit of the present invention is not limited thereto. The generalized stabilizing method according to the embodiment of the present invention can be widely applied to stabilizing processing of characters in computer animations, or other multi-link structures.

In brief, the present invention has been disclosed for the purpose of illustration, and thus the contents described in the present specification are not to be construed as restrictive. In order to judge the spirit of the present invention, the claims should be taken into consideration.

It should be understood by those skilled in the art that various modifications, combinations, sub-combinations, and alternations may occur depending on design requirements and other factors insofar as they are within the scope of the appended claims or the equivalents thereof.

What is claimed is:

1. A control system of a multi-link structure configured by connecting a plurality of rigid bodies together, the control system comprising:
   a state equation setting unit configured to set a state equation which describes the relation between the momentum of a whole system concerning the multi-link structure and a control input, and calculate:
      a first matrix to be used with a state variable comprising a translational momentum and an angular momentum around a center of gravity of the multi-link structure; and
      a second matrix to be used with the control input comprising an external moment and an external force from an environment to the multi-link structure; and
   a predictive control target value setting unit configured to set a control target value from a current time to a future time;
   a stability evaluation function setting unit configured to set a stability evaluation function comprising:
      a first element evaluating whether a translational and angular momentums of the multi-link structure converge to a target translational and angular momentums, wherein the target translational and angular momentums includes a grounding value and a non-grounding value,
      a second element evaluating whether the translational momentum follows the target translational momentum the whole time from the current time to the future time, and
      a third element evaluating an external force acting on the multi-link structure, wherein the stability evaluation function setting unit is further configured to set a weighting matrix for each of the first, second, and third elements;
   an optimal control input determining unit configured to determine an optimal control input to give a minimum value of the stability evaluation function under constraint conditions configured by the state equation;
   an optimal momentum calculating unit configured to calculate an optimal momentum to be generated by the optimal control input; and
   a joint driving method determining unit configured to determine a joint driving method of the multi-link structure for realizing the optimal momentum.

2. The control system according to claim 1, wherein the predictive control target value setting unit sets information on a point of action of an external force of the multi-link structure as the control target value.

3. The control system according to claim 1, wherein the predictive control target value setting unit sets information on an external force or external moment applied to the multi-link structure as the control target value.

4. The control system according to claim 1, wherein the predictive control target value setting unit sets information on the center of gravity, center-of-gravity speed, or momentum of the multi-link structure as the control target value.

5. The control system according to claim 1, wherein the predictive control target value setting unit sets information on the angular momentum of the multi-link structure as the control target value.

6. The control system according to claim 1, wherein the stability evaluation function setting unit and the optimal momentum calculating unit deal with the translational momentum or angular momentum around the center of gravity or other predetermined points, of the multi-link structure, as the momentum.

7. The control system according to claim 1, wherein the control input includes a point of action of a force acting on the whole multi-link structure.

8. The control system according to claim 1, wherein the stability evaluation function setting unit sets a stability evaluation function including a deviation of the control target value.

9. The control system according to claim 1, wherein the stability evaluation function setting unit sets a stability evaluation function including a control input.

10. The control system according to claim 1, further comprising an inequality constraint condition setting unit configured to set inequality constraint conditions concerning a control input,
   wherein the optimal momentum calculating unit calculates an optimal momentum under the inequality constraint conditions.

11. The control system according to claim 1,
wherein the joint driving method determining unit determines a joint driving method using an operational space inertia inverse matrix concerning the momentum or center of gravity.

12. The control system according to claim 1,
wherein the joint driving method determining unit determines a Jacobian determinant concerning the momentum or center of gravity.

13. The control system according to claim 1,
wherein the joint driving method determining unit further sets constraint conditions in addition to the momentum, and determines a joint driving method so as to simultaneously satisfy constraints concerning the momentum and other motion constraints.

14. The control system according to claim 1,
wherein the state equation setting unit is further configured to calculate a third matrix expressed as $$\begin{pmatrix} \sum f_i + Mg \\ \sum l_i \times f_i \\ 0 \end{pmatrix},$$

where $f_i$ denotes an external force at an i-th point $l_i$, M denotes the total weight of the multi-link structure, and g denotes the acceleration of gravity.

15. A control method of a multi-link structure configured by connecting a plurality of rigid bodies together, the control method comprising the steps of:
setting a state equation which describes the relation between the momentum of a whole system concerning the multi-link structure and a control input;
calculating a first matrix to be used with a state variable comprising a translational momentum and an angular momentum around a center of gravity of the multi-link structure;
calculating a second matrix to be used with the control input comprising an external moment and an external force from an environment to the multi-link structure;
setting a control target value from a current time to a future time;
setting a stability evaluation function comprising:
a first element evaluating whether a translational and angular momentums of the multi-link structure converge to a target translational and angular momentums, wherein the target translational and angular momentums includes a grounding value and a non-grounding value,
a second element evaluating whether the translational momentum follows the target translational momentum the whole time from the current time to the future time, and
a third element evaluating an external force acting on the multi-link structure;
setting a weighting matrix for each of the first, second, and third elements;
determining an optimal control input to give a minimum value of the stability evaluation function under constraint conditions configured by the state equation;
calculating an optimal momentum to be generated by the optimal control input; and
determining a joint driving method of the multi-link structure for realizing the optimal momentum.

16. A computer-readable medium tangibly storing a computer program to be executed on a computer system so as to control a multi-link structure configured by connecting a plurality of rigid bodies together,
the computer program causing the computer system to execute the steps of:
setting a state equation which describes the relation between the momentum of a whole system concerning the multi-link structure and a control input;
calculating a first matrix to be used with a state variable comprising a translational momentum and an angular momentum around a center of gravity of the multi-link structure;
calculating a second matrix to be used with the control input comprising an external moment and an external force from an environment to the multi-link structure;
setting a control target value from a current time to a future time;
setting a stability evaluation function comprising:
a first element evaluating whether a translational and angular momentums of the multi-link structure converge to a target translational and angular momentums, wherein the target translational and angular momentums includes a grounding value and a non-grounding value,
a second element evaluating whether the translational momentum follows the target translational momentum the whole time from the current time to the future time, and
a third element evaluating an external force acting on the multi-link structure;
setting a weighting matrix for each of the first, second, and third elements;
determining an optimal control input to give a minimum value of the stability evaluation function under constraint conditions configured by the state equation;
calculating an optimal momentum to be generated by the optimal control input; and
determining a joint driving method of the multi-link structure for realizing the optimal momentum.

17. A control system of a multi-link structure configured by connecting a plurality of rigid bodies together, the control system comprising:
a state equation setting section which sets a state equation which describes the relation between the momentum of a whole system concerning the multi-link structure and a control input, and calculate:
a first matrix to be used with a state variable comprising a translational momentum and an angular momentum around a center of gravity of the multi-link structure; and
a second matrix to be used with the control input comprising an external moment and an external force from an environment to the multi-link structure; and
a predictive control target value setting section which sets a control target value from a current time to a future time;
a stability evaluation function setting section which sets a stability evaluation function comprising:
a first element evaluating whether a translational and angular momentums of the multi-link structure converge to a target translational and angular momentums, wherein the target translational and angular momentums includes a grounding value and a non-grounding value, a second element evaluating whether the translational momentum follows the target translational momentum the whole time from the current time to the future time, and a third element evaluating an external force acting on the multi-link structure, wherein the stability evaluation function setting unit is further configured to set a weighting matrix for each of the first, second, and third elements;

an optimal control input determining section which determines an optimal control input to give a minimum value of the stability evaluation function under constraint conditions configured by the state equation;

an optimal momentum calculating section which calculates an optimal momentum to be generated by the optimal control input; and a joint driving method determining section which determines a joint driving method of the multi-link structure for realizing the optimal momentum.

* * * * *